(12) United States Patent
Luis y Prado (10) Patent No.: US 10,029,720 B2
(45) Date of Patent: Jul. 24, 2018

(54) TRANSPORTING LOADS ON SUPPORT SURFACES

(71) Applicant: Workshops for Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 0 days.

(21) Appl. No.: 15/204,721

(22) Filed: Jul. 7, 2016

(65) Prior Publication Data

US 2016/0318536 A1    Nov. 3, 2016

Related U.S. Application Data

(62) Division of application No. 14/485,009, filed on Sep. 12, 2014.

(60) Provisional application No. 61/877,055, filed on Sep. 12, 2013.

(51) Int. Cl.
*B62B 3/10* (2006.01)
*B62B 5/00* (2006.01)

(52) U.S. Cl.
CPC .............. *B62B 3/10* (2013.01); *B62B 5/0086* (2013.01); *B62B 5/0093* (2013.01); *B62B 2202/10* (2013.01); *Y10T 29/49826* (2015.01)

(58) Field of Classification Search
CPC ........ B62B 3/10; B62B 5/0086; B62B 5/0093
See application file for complete search history.

(56) References Cited

U.S. PATENT DOCUMENTS

| | | | |
|---|---|---|---|
| 2,186,188 A | 1/1940 | Allen | |
| 5,871,384 A | 2/1999 | Kichijo | |
| 6,851,496 B2 | 2/2005 | Prucher | |
| 6,886,787 B2 | 5/2005 | Stahl | |
| 8,348,073 B2 * | 1/2013 | Foust | B66C 23/365 212/175 |
| 9,027,942 B2 * | 5/2015 | Hasegawa | B62B 5/0086 280/79.11 |
| 2008/0111329 A1 | 5/2008 | Brown et al. | |
| 2012/0228314 A1 * | 9/2012 | Miller | B65F 1/14 220/675 |
| 2014/0020234 A1 | 1/2014 | Prado | |

* cited by examiner

*Primary Examiner* — John D Walters
*Assistant Examiner* — James J Triggs
(74) *Attorney, Agent, or Firm* — Fish & Richardson P.C.

(57) ABSTRACT

In certain aspects, a roller assembly includes a base structure defining multiple recesses that extend inwardly from a top surface of the base structure, a first wheel, and a second wheel. The multiple recesses are configured such that at least one of the multiple recesses is engageable with an auxiliary component of the load, and the multiple recesses include a central recess positioned at a center of the top surface of the base structure. The first wheel is disposed along a first side of the base structure, and the second wheel is disposed along a second side of the base structure, the second side of the base structure being spaced apart from and parallel to the first side of the base structure.

10 Claims, 7 Drawing Sheets

TRANSPORTING LOADS ON SUPPORT SURFACES

CROSS REFERENCE TO RELATED APPLICATIONS

This application is a divisional of and claims the benefit under 35 U.S.C. § 120 of U.S. patent application Ser. No. 14/485,009, filed on Sep. 12, 2014, which claims the benefit under 35 U.S.C. § 119(e)(1) of U.S. Provisional Patent Application No. 61/877,055, filed on Sep. 12, 2013, which are incorporated by reference herein

TECHNICAL FIELD

This disclosure relates to rollers, such as moving skates used for transporting machines or other loads on support surfaces, and related methods.

BACKGROUND

Various loads (e.g., machines, industrial equipment items, packages, etc.) located in industrial environments may need to be transported for implementation within a manufacturing process, storing, deconstruction, or other purposes. Transporting particularly large or heavy loads in a stable, secure, safe, or otherwise adequate manner may be costly, time-intensive, and cumbersome. In some cases, a load may require leveling prior to being transported, depending on an evenness of a support surface along which the load is being moved or depending on a performance requirement of the load at a desired destination. Some loads, such as certain industrial equipment items, tend to be very large and heavy, thus making them infeasible to be moved using standard techniques and conveyances, such as by lifting the equipment items onto a dolly, cart, or other vehicle.

SUMMARY

In one aspect, a roller assembly for transporting a load includes a base structure defining multiple recesses that extend inwardly from a top surface of the base structure, a first wheel, and a second wheel. The multiple recesses are configured such that at least one of the multiple recesses is engageable with an auxiliary component of the load, and the multiple recesses include a central recess positioned at a center of the top surface of the base structure. The first wheel is disposed along a first side of the base structure, and the second wheel is disposed along a second side of the base structure, the second side of the base structure being spaced apart from and parallel to the first side of the base structure.

In another aspect, a method of transporting a load across a support surface includes inserting at least two roller assemblies underneath the load and moving the load across the support surface while the at least two roller assemblies are disposed underneath the load. The at least two roller assemblies have a strength that is sufficient to support the load. Each roller assembly includes a base structure defining multiple recesses that extend inwardly from a top surface of the base structure, a first wheel, and a second wheel. The multiple recesses are configured such that at least one of the multiple recesses is engageable with an auxiliary component of the load, and the multiple recesses include a central recess positioned at a center of the top surface of the base structure. The first wheel is disposed along a first side of the base structure, and the second wheel is disposed along a second side of the base structure, the second side of the base structure being spaced apart from and parallel to the first side of the base structure.

In another aspect, a method of manufacturing a roller assembly includes forming a profile and forming multiple recesses that extend inwardly from a first surface of the profile to form a base structure of the roller assembly. The multiple recesses are configured such that at least one of the multiple recesses is engageable with an auxiliary component of a load, and the multiple recesses include a central recess positioned at a center of the first surface of the profile. The method further includes coupling a first wheel to the base structure along a first side of the base structure and coupling a second wheel to the base structure along a second side of the base structure, the second side of the base structure being spaced apart from and parallel to the first side of the base structure.

In another aspect, a machine skate includes a plate, at least two axles operatively coupled to the plate, and at least four rotatable wheels, two of the at least four rotatable wheels being operatively coupled to each of the at least two axles. The plate includes multiple recesses configured to receive corresponding projections associated with an adjacent member such that the plate and the adjacent member are engaged in a manner that restricts relative horizontal movement between the plate and the adjacent member.

In another aspect, a machine skate includes an H-shaped plate including a cone-shaped recess formed at a center of the H-shaped plate, the cone-shaped recess configured to receive a set screw. The machine skate further includes at least two axles operatively coupled to the H-shaped plate, at least four rotatable wheels, two of the at least four rotatable wheels being operatively coupled to each of the at least two axles, and a handle attachment mechanism disposed at an end of the H-shaped plate.

In some implementations, the base structure includes first and second projections that extend respectively along the first and second sides of the base structure.

In certain implementations, the roller assembly further includes a handle that is coupled to the base structure.

In some implementations, the first and second projections of the base structure define an opening sized to receive an end portion of the handle.

In certain implementations, the multiple recesses are spaced apart from one another, such that two of the multiple recess are disposed adjacent the first side of the base structure and two of the multiple recesses are disposed adjacent the second side of the base structure.

In some implementations, the central recess forms a graduated recess.

In certain implementations, the central recess includes one or more concentric levels.

In some implementations, the central recess includes a groove extending inwardly from the one or more concentric levels.

In certain implementations, the top surface of the base structure forms a textured surface.

In some implementations, the auxiliary component is a leveling component.

In certain implementations, the auxiliary component is a support leg.

In some implementations, the roller assembly further includes one or more support plates stacked adjacent the base structure of the roller assembly.

In certain implementations, each support plate of the one or more support plates includes multiple posts that extend outward from a bottom surface of the support plate, the multiple posts being configured to be disposed within the multiple recesses, respectively.

In some implementations, the multiple posts and the multiple recesses nest with each other such that the leveling plate and the base structure are substantially prevented from moving with respect to each other in two dimensions.

In certain implementations, each support plate of the multiple support plates includes multiple nesting features configured to engage the multiple posts on an adjacent support plate.

In some implementations, the roller assembly is configured to transport a weight of up to about 100,000 lb.

In certain implementations, the roller assembly is configured to transport a weight of up to about 10,000 lb.

In some implementations, the method of transporting a load across a support surface further includes determining distances at which portions of the load should be lifted above the support surface.

In certain implementations, the method of transporting a load across a support surface further includes lifting the load from the support surface.

In some implementations, the method of transporting a load across a support surface further includes adjusting a height of at least one of the two roller assemblies.

In certain implementations, moving the load across the support surface includes applying a force to a handle coupled to at least one of the two roller assemblies.

In some implementations, the base structure includes first and second projections that extend respectively along the first and second sides of the base structure.

In certain implementations, the first and second projections of the base structure define an opening sized to receive an end portion of the handle.

In some implementations, the multiple recesses are spaced apart from one another, such that two of the multiple recess are disposed adjacent the first side of the base structure and two of the multiple recesses are disposed adjacent the second side of the base structure.

In certain implementations, the central recess forms a graduated recess.

In some implementations, the central recess includes one or more concentric levels.

In certain implementations, the central recess includes a groove extending inwardly from the one or more concentric levels.

In some implementations, the top surface of the base structure forms a textured surface.

In certain implementations, the auxiliary component is a leveling component.

In some implementations, the auxiliary component is a load-bearing support.

In certain implementations, each roller assembly further includes one or more support plates stacked adjacent the base structure of the roller assembly.

In some implementations, each support plate of the one or more support plates includes multiple posts that extend outward from a bottom surface of the support plate, the multiple posts being configured to be disposed within the multiple recesses, respectively.

In certain implementations, the multiple posts and the multiple recesses nest with each other such that the leveling plate and the base structure are substantially prevented from moving with respect to each other in two dimensions.

In some implementations, each support plate of the multiple support plates includes multiple nesting features configured to engage the multiple posts on an adjacent support plate.

In certain implementations, each roller assembly is configured to transport a weight of up to about 100,000 lb.

In some implementations, each roller assembly is configured to transport a weight of up to about 10,000 lb.

In certain implementations, the method of manufacturing the roller assembly further includes forming a texture on the first surface of the profile.

In some implementations, the method of manufacturing the roller assembly further includes forming a groove along a second surface of the profile, the second surface opposite the first surface of the profile.

In certain implementations, the method of manufacturing the roller assembly further includes joining a shaft to the groove along the second surface of the profile.

In some implementations, the method of manufacturing the roller assembly further includes applying a lubricant to the shaft.

In certain implementations, coupling the first and second wheels to the base structure includes mounting the first and second wheels to the shaft.

In some implementations, the base structure includes first and second projections that extend respectively along the first and second sides of the base structure.

In certain implementations, the method of manufacturing the roller assembly further includes securing a handle to the base structure.

In some implementations, the first and second projections of the base structure define an opening sized to receive an end portion of the handle.

In certain implementations, the multiple recesses are spaced apart from one another, such that two of the multiple recess are disposed adjacent the first side of the base structure and two of the multiple recesses are disposed adjacent the second side of the base structure.

In some implementations, the central recess forms a graduated recess.

In certain implementations, the central recess includes one or more concentric levels.

In some implementations, the central recess includes a groove extending inwardly from the one or more concentric levels.

In certain implementations, the auxiliary component is a leveling component.

In some implementations, the auxiliary component is a support leg.

In certain implementations, the method of manufacturing the roller assembly further includes stacking one or more support plates adjacent the base structure of the roller assembly.

In some implementations, each support plate of the one or more support plates includes multiple posts that extend outward from a bottom surface of the support plate, the multiple posts being configured to be disposed within the multiple recesses, respectively.

In certain implementations, the multiple posts and the multiple recesses nest with each other such that the leveling plate and the base structure are substantially prevented from moving with respect to each other in two dimensions.

In some implementations, each support plate of the multiple support plates includes multiple nesting features configured to engage the multiple posts on an adjacent support plate.

In certain implementations, the roller assembly is configured to transport a weight of up to about 100,000 lb.

In some implementations, the roller assembly is configured to transport a weight of up to about 10,000 lb.

In certain implementations, the H-shaped plate further includes multiple recesses configured to receive corresponding projections associated with an adjacent member such that the H-shaped plate and the adjacent member are engaged in a manner that prevents relative horizontal movement between the H-shaped plate and the adjacent member.

In some implementations, the adjacent member includes a stackable leveling plate having projections sized and shaped to fit securely within respective recesses of the H-shaped plate.

In certain implementations, the machine skate further includes a handle that is configured to be coupled with the handle attachment mechanism.

In some implementations, the handle attachment mechanism is a first handle attachment mechanism, and the end is a first end of the H-shaped plate, wherein the machine skate further includes a second handle attachment mechanism disposed at a second end of the H-shaped plate, the second end opposed to the first end.

In certain implementations, the handle attachment mechanism includes holes that are formed through arms of the H-shaped plate and that are configured to receive a bolt.

Particular implementations of the subject matter described in this specification may be configured to realize one or more of the following potential advantages.

In some implementations, the base of the roller provides a support structure upon which an auxiliary component (e.g., a leveling plate) may be placed.

In certain implementations, the texture on the top surface of the base of the roller can provide additional friction between the base and an auxiliary component that may be placed on the top surface of the base. Such friction may improve the grip or extent of engagement between the base and the auxiliary component.

In some implementations, the arrangement, shape, and size of the recesses across the top surface of the base allow for engagement of the base with an auxiliary component.

In certain implementations, the low profile of the roller (e.g., the height of the top surface of the roller as measured from a support surface, and as compared to heights of alternative rollers) allows a load to be transported while maintaining a relatively low center of gravity, thereby minimizing a distance that the load may fall in case the load is displaced from the roller. Accordingly, the low profile of the roller may improve the safety and maneuverability of the roller while the roller is being used to transport the load.

In some implementations, the handle provides for steering of the roller.

In certain implementations, the gripping member of the handle may be manipulated (e.g., pushed, pulled, or rotated) by an operator to move the roller along with any component that is engaged (e.g., directly or indirectly) with the roller.

In some implementations, the stacked roller may be positioned underneath a load (e.g., a machine, a piece of industrial equipment, a package, etc.) for leveling and/or transporting the load.

In certain implementations (e.g., in cases where the leveling component directly engages the central recess of the roller), the leveling component may bear against either of the concentric levels or the groove of the central recess.

In some implementations, the recesses provide a self-capturing capability to the rollers and to the leveling plate, facilitating positioning (e.g., aligning) of an auxiliary component of the load relative to the rollers and the leveling plate.

In certain implementations, the graduated feature of the central recess provides the roller with a self-centering capability, facilitating settling (e.g., gravity-induced settling or settling due to an externally applied force) of an auxiliary component within a concentric level or the groove of the central recess.

DESCRIPTION OF DRAWINGS

Like reference numbers and designations in the various drawings indicate like elements.

DETAILED DESCRIPTION

Figure 1A:
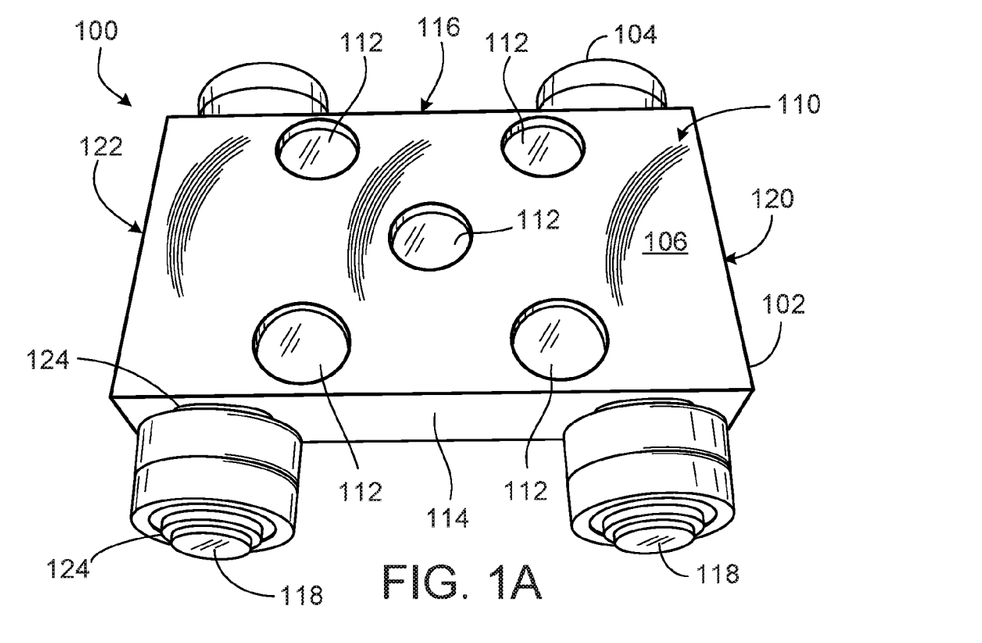
FIGS. 1A and 1B are top and bottom perspective views of a roller.
Figure 1B:
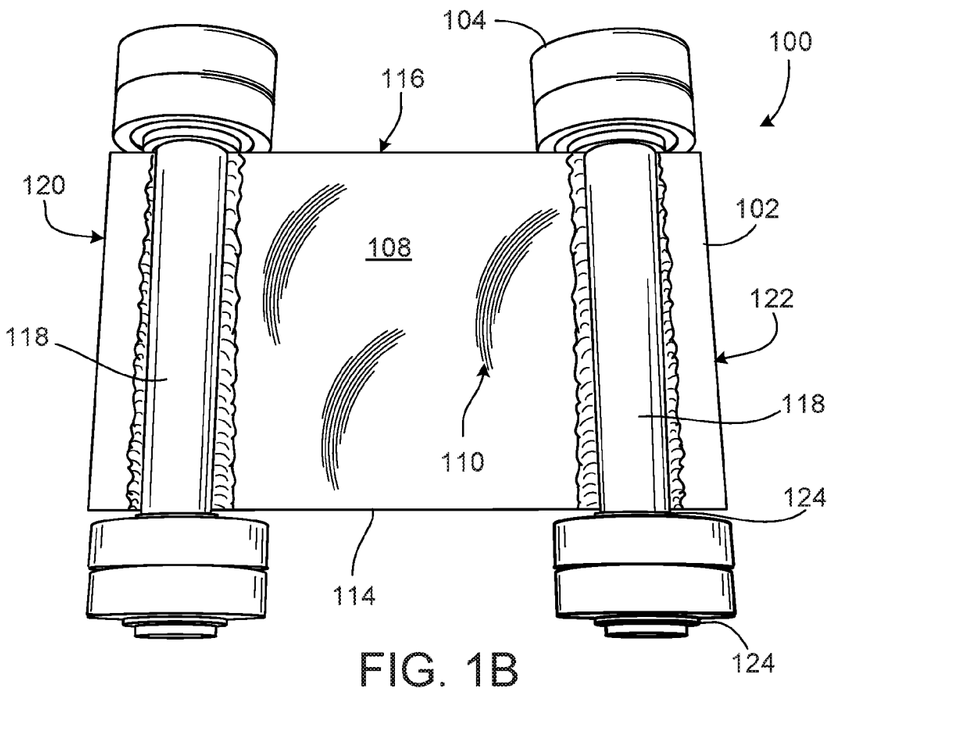

FIGS. 1A and 1B illustrate a roller 100 (e.g., a skate) that can be used for transporting loads (e.g., machines, industrial equipment items, packages, etc.) across surfaces (e.g., manufacturing floors, ramps, or ship decks). The roller 100 includes a base 102 and four wheels 104 (e.g., bearings) that provide for movement of the roller 100 across a surface. The base 102 provides a support structure upon which an auxiliary component (e.g., a leveling plate or a support member of a load) may be placed (e.g., positioned, nested, or interlocked), as will be discussed in more detail below.

The base 102 defines a top surface 106 (shown in FIG. 1A) and a bottom surface 108 (shown in FIG. 1B) that have a texture 110 (e.g., a scoring, a knurling, or a non-skid coating, such as sand paper). The texture 110 on the top surface 106 can provide additional friction between the base 102 of the roller 100 and an auxiliary component that may be placed (e.g., positioned, nested, or interlocked) on the top surface 106 of the base 102. Such friction may improve the grip or extent of engagement between the base 102 and the auxiliary component. The base 102 defines five recesses 112 that extend from the top surface 106 of the base 102. The recesses 112 also have a texture (e.g., the texture 110 or another texture) formed across their surfaces. The recesses 112 are generally circular in cross-sectional shape and spaced apart from one another. Two recesses 112 are positioned along a first side 114 of the base 102, and two recesses 112 are positioned along a second side 116 of the base 102 opposite the first side 114. One recess 112 is located at an approximate center of the top surface 106 of the base 102. The arrangement, shape, and size of the recesses 112 across the top surface 106 of the base 102 allow for engagement (e.g., nesting or interlocking) of the base 102 with an auxiliary component (e.g., a leveling plate or a jacking screw of a machine), as will be discussed in more detail with respect to FIGS. 3A-4 and 7.

The roller 100 further includes two shafts 118 (e.g., axles) that each support two of the wheels 104. The shafts 118 are located along the bottom surface 108 of the base 102 and are spaced apart from opposing third and fourth sides 120, 122 of the base 102. The shafts 118 extend beyond the sides 114, 116 of the base 102, providing structures upon which the wheels 104 are mounted. The wheels 104 are secured on the shafts 118 via retaining clips 124 (e.g., C-clips or lock-ring clips) that are disposed on opposite sides of the wheels 104. In some cases, a washer may be provided between any side of any wheel 104 and any retaining clip 124. Lubricant (e.g., synthetic grease) on the shafts 118 allows the wheels 104 to rotate around the shafts 118 as the roller 100 is moved across a surface. In some embodiments, the wheels 104 may be self-lubricating wheels. In some examples, the roller 100 may be placed underneath a load for transporting the load.

In the example roller 100 of FIGS. 1A and 1B, the base 102 is generally rectangular in cross-sectional shape. The base 102 has a length, width, and thickness of about 6 inches, about 3.625 inches, and about 0.75 inch, respectively. The peripheral recesses 112 are positioned (e.g., centered) at about 0.5625 inch from respective first and second sides 114, 116 and about 1.75 inches from respective third and fourth sides 120, 122 of the base 102. The recesses 112 have a depth of about 0.0625 inch and a diameter of about 0.875 inch. The shafts 118 have a length of about 6 inches and a diameter of about 0.75 inch. The shafts 118 are positioned (e.g., as measured from central axes of the shafts 118) at about 0.875 inches from the third and fourth sides 120, 122 of the base 102. The wheels 104 have an outer diameter of about 1.625 inches and an inner diameter of about 0.75 inch. In some examples, the low profile of the roller 100 (e.g., the height of the top surface 106 of the roller 100 as measured from a support surface, and as compared to heights of alternative rollers) allows a load to be transported while maintaining a relatively low center of gravity, thereby minimizing a distance that the load may fall in case the load is displaced from the roller 100. Accordingly, the low profile of the roller 100 may improve the safety and maneuverability of the roller 100 while the roller 100 is being used to transport the load.

In a general embodiment, a roller may include one or more components of dimensions, shape, number, position, and/or arrangement different from those of the roller 100. For example, in some cases, a roller may include a base that has a size different from the one of the base 102 or a base that has a non-rectangular (e.g., circular, triangular, generally trapezoidal, or other) cross-sectional shape. In some examples, a base may include recesses that have a non-circular (e.g., rectangular, triangular, generally trapezoidal, or other) cross-sectional shape or a depth different from that of the recesses 112. In some cases, a base may include recesses that are arranged in a pattern different from that of the recesses 112. In some examples, a roller may include a shaft and/or wheels that have different dimensions (e.g., a length and/or a diameter) or a different arrangement from those of the shafts 118 and the wheels 104. In some cases, a roller may include a different number of (e.g., two, three, five, or six) wheels 104 that are disposed along any side of the base of the roller. In some examples, any surface of a base of a roller (e.g., a top surface, a bottom surface, or a side surface) may have a texture or be a substantially smooth surface.

In some examples, the roller 100 may be configured to transport particularly heavy loads, such as loads of up to about 10,000 lb. For example, each roller 100 may be configured to transport a load of up to about 10,000 lb, such that four rollers 100 may be used together to transport a load of up to about 40,000 lb. Various components of the roller 100 (e.g., the base 102, the wheels 104, and the shafts 118) may be made of one or more materials including steel (e.g., milled or stainless), aluminum, titanium, an exotic alloy (e.g., Inconel or Monel), or any other materials that have mechanical properties sufficient to provide a desired load rating to the roller 100.

Figure 2:
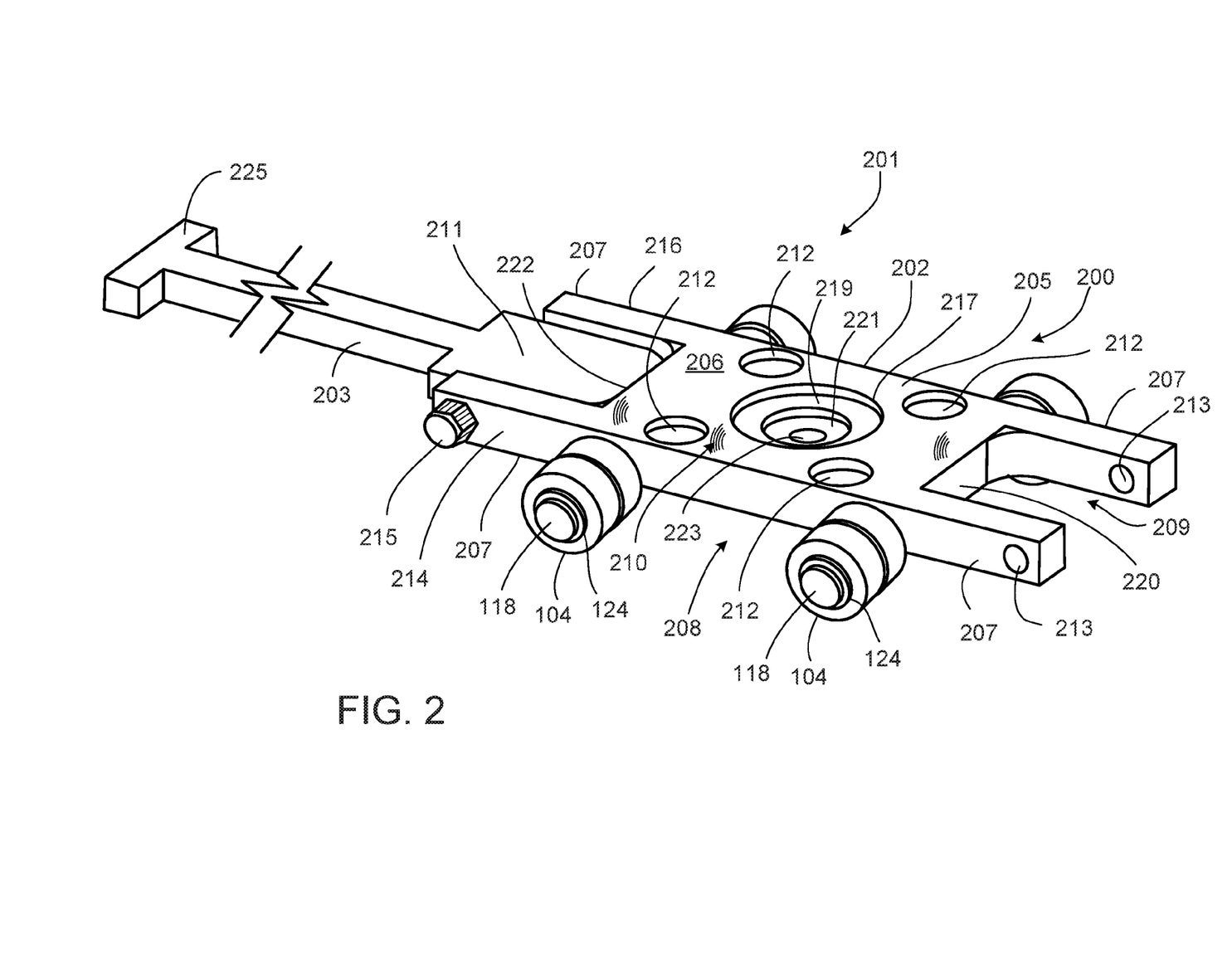
FIG. 2 is a perspective view of a roller assembly including a roller and a handle.

FIG. 2 illustrates a roller assembly 201 (e.g., a skate assembly) that can be used for transporting loads (e.g., machines, industrial equipment items, packages, etc.) across surfaces (e.g., manufacturing floors, ramps, or ship decks). The roller assembly 201 includes a roller 200 and a handle 203 that provides for steering of the roller 200. The roller 200 includes a base 202 and four of the wheels 104, which provide for movement of the roller 200 across a surface. The base 202 provides a support structure upon which an auxiliary component (e.g., a leveling plate or a support member of a load) may be placed (e.g., positioned, nested, or interlocked), as will be discussed in more detail with respect to FIGS. 3A, 3B, 5, and 7.

The base 202 includes a central region 205 and four projections 207 (e.g., arms) that extend from respective corners of the central region 205 of the base 102. Accordingly, the base 202 has a generally H-shaped cross-section. Each pair of adjacent projections 207 defines an opening 209 that is sized to receive a distal end 211 of the handle 203. The projections 207 further define respective apertures 213 that are sized to receive a bolt 215 for securing the handle 203 to the base 202 of the roller 200.

The base 202 defines a top surface 206 and a bottom surface 208 that have a texture 210 (e.g., a scoring, a knurling, or a non-skid coating, such as sand paper). The texture 210 provides additional friction between the base 202 of the roller 200 and an auxiliary component that may be placed (e.g., positioned, nested, or interlocked) atop the base 202. Such friction may improve the grip or extent of engagement between the base 202 and the auxiliary component (e.g., a leveling plate). The base 200 defines four recesses 212 and a graduated recess 217 (e.g., a stepped recess) that extend from the top surface 206 of the base 202. The recesses 212, 217 also have a texture (e.g., the texture 210 or another texture) formed across their surfaces. The recesses 212, 217 are generally circular in cross-sectional shape and are spaced apart from one another. The graduated recess 217 includes two concentric levels 219, 221 (e.g., annular shaped levels) and a groove 223 (e.g., a conical groove) that extends from the concentric level 221. Two recesses 212 are positioned along a first side 214 of the base 202, and two recesses 212 are positioned along a second side 216 of the base 202 opposite the first side 214. The graduated recess 217 is located at an approximate center of the top surface 206 of the base 202. The arrangements, shapes, and sizes of the recesses 212, 217 across the top surface 206 of the base 202 allows for engagement (e.g., nesting or interlocking) of the base 202 with an auxiliary component (e.g., a leveling plate, a jacking screw, or a set screw of a machine), as will be discussed in more detail with respect to FIGS. 3A, 3B, 5, and 7.

The roller 200 further includes the two shafts 118 that each support two of the wheels 104. The shafts 118 are located along the bottom surface 208 of the base 202 and are spaced apart from opposing third and fourth sides 220, 222 of the base 202. The shafts 118 extend beyond the sides 214, 216 of the base 202, providing structures upon which the wheels 104 are mounted. As discussed above with respect to FIGS. 1A and 1B, the wheels 104 are secured on the shafts 118 via the retaining clips 124 that are disposed on opposite sides of the wheels 104. Lubricant (e.g., synthetic grease) on the shafts 118 allows the wheels 104 to rotate around the shafts 118 as the roller 200 is moved across a surface. In some embodiments, the wheels 104 may be self-lubricating wheels.

The handle 203 may rotate about the bolt 215 when secured to the base 202 of the roller 200. The handle 203 further includes a gripping member 225 that forms a proximal end of the handle 203. The gripping member 225 of the handle 203 may be manipulated (e.g., pushed, pulled, or rotated) by an operator to move the roller 200 along with any component that is engaged (e.g., directly or indirectly) with the roller 200.

In the example roller 200 of FIGS. 2A and 2B, the central region 205 of the base 202 (e.g., the generally rectangular region of the base as approximately defined by the four sides 214, 216, 220, 222) has a length and a width of about 6 inches and about 3.625 inches, respectively. The projections 207 of the base 202 have a length of about 2 inches to about 3 inches. The base 202 has a thickness of about 0.75 inches. The recesses 212 are positioned (e.g., centered) at about 0.5625 inch from respective first and second sides 214, 216 of the base 202. The recesses 212 are further positioned (e.g., centered) at a distance of about 1.75 inches from planes that are coincident with respective third and fourth sides 220, 222 of the base 202. The recesses 212 have a depth of about 0.0625 inch and a diameter of about 0.875 inch. The concentric levels 219, 221 of the graduated recess 217 each have individual depths of about 0.0625 inch. The concentric levels 219, 221 of the graduated recess 217 have outer diameters of about 2 inches and about 1.25 inches, respectively. The groove 223 has a base diameter of about 0.625 inch and a depth of about 0.5 inch (e.g., as measured from the height of the concentric level 221). The shafts 118 are positioned (e.g., as measured from central axes of the shafts 118) at about 0.875 inches from planes that are coincident with respective third and fourth sides 220, 222 of the base 202. The handle 203 has a length of about 24 inches to about 48 inches.

In some examples, the low profile of the roller 200 (e.g., the height of the top surface 206 of the roller 200 as measured from a support surface, and as compared to heights of alternative rollers) allows a load to be transported while maintaining a relatively low center of gravity, thereby minimizing a distance that the load may fall in case the load is displaced from the roller 200. Accordingly, the low profile of the roller 200 may improve the safety and maneuverability of the roller 200 while the roller 200 is being used to transport the load.

In a general embodiment, a roller assembly may include one or more components of dimensions, shape, number, position, and/or arrangement different from those of the roller 200. For example, in some cases, a roller of a roller assembly may include a base that has a size different from that of the base 202 or a base that has a non-rectangular (e.g., circular, triangular, generally trapezoidal, or other) cross-sectional shape. In some examples, a base may include recesses that have a non-circular (e.g., rectangular, triangular, generally trapezoidal, or other) cross-sectional shape or depths different from those of the recesses 212, 217. In some cases, a base may include recesses that are arranged in a pattern different from that of the recesses 212, 217. In some examples, a base may alternatively include a non-graduated central recess instead of a graduated central recess. In some examples, a roller of a roller assembly may include a shaft and/or wheels that have a different dimensions (e.g., a length and/or a length) or a different arrangement from those of the shafts 118 and the wheels 104. In some cases, a roller may include a different number of (e.g., two, three, five, or six) wheels 104 that are disposed along any side of the base of the roller. In some examples, a roller assembly may include a handle that has a length different from that of the handle 203. In some cases, a handle may include a gripping member that has a shape different from that of the gripping member 225 of the handle 203. For example, a handle of a roller assembly may have a U-shaped end that can be attached to a rope or a chain. In some examples, a handle of a roller assembly may include a bend of about 30 degrees to about 45 degrees located at about 12 inches to about 24 inches from a distal end of the handle.

In some examples, the roller 200 may be configured to transport particularly heavy loads, such as loads of up to about 10,000 lb. For example, each roller 200 may be configured to transport a load of up to about 10,000 lb, such that four rollers 200 may be used together to transport a load of up to about 40,000 lb. The base 202 of the roller 200 may be made of one or more materials including steel (e.g., milled or stainless), aluminum, titanium, an exotic alloy (e.g., Inconel or Monel), or any other materials that have mechanical properties sufficient to provide a desired load rating to the roller 200. The handle 203 of the roller assembly 201 may be made of one or more materials including steel (e.g., milled or stainless), aluminum, titanium, an exotic alloy (e.g., Inconel or Monel), or any other materials that have mechanical properties sufficient to transmit an appropriate force to the base 202 of the roller 200.

Figure 3A:
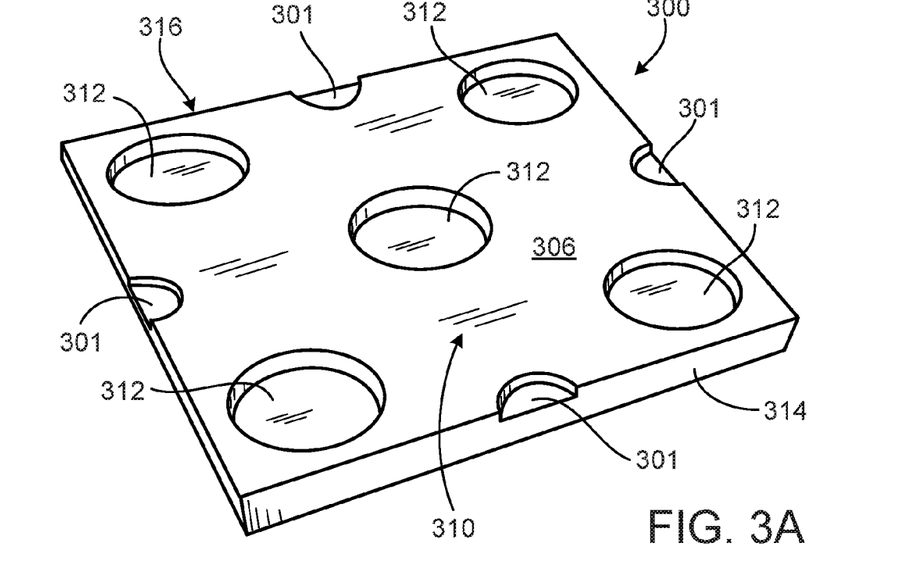
FIGS. 3A and 3B are top and bottom perspective views of a leveling plate that can be engaged with the roller of FIGS. 1A and 1B or the roller of FIG. 2.
Figure 3B:
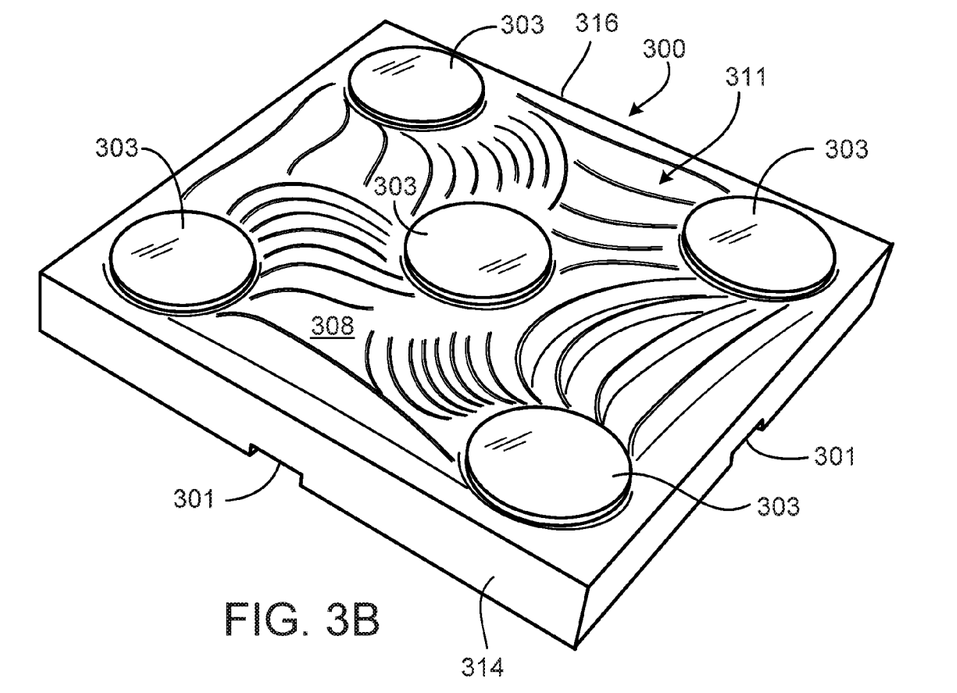

FIGS. 3A and 3B illustrate a leveling plate 300 that can be used for leveling a load (e.g., a machine, an industrial equipment item, a package, etc.) on a support surface (e.g., the top surfaces 106, 206 of the bases 102, 202) while being engaged (e.g., nested) with the support surface. For example, the leveling plate 300 is configured to engage the bases 102, 202 of the rollers 100, 200. In some examples, the leveling plate 300 may be configured to support particularly heavy loads, such as loads of up to about 100,000 lb.

The leveling plate 300 defines a top surface 306 (shown in FIG. 3A) and a bottom surface 308 (shown in FIG. 3B) that have respective textures 310, 311 (e.g., a scoring, a knurling, or a non-skid coating, such as sand paper). The texture 310 on the top surface 306 can provide additional friction between the leveling plate 300 and a load that may be supported by (e.g., placed atop, nested, or interlocked with) the leveling plate 300. Such friction may improve the grip or extent of engagement between the leveling plate 300 and the load. The texture 311 on the bottom surface 308 can provide additional friction between the leveling plate 300 and a surface upon which the leveling plate 300 is supported. Such friction may improve the grip or extent of engagement between the leveling plate 300 and the surface.

Referring to FIG. 3A, the leveling plate 300 defines five recesses 312 that extend from the top surface 306 of the leveling plate 300. The recesses 312 are generally circular in cross-sectional shape and spaced apart from one another. Two recesses 312 are positioned along a first side 314 of the leveling plate 300, and two recesses 312 are positioned along a second side 316 of the leveling plate 300 opposite the first side 314. One recess 312 is located at an approximate center of the top surface 306 of the leveling plate 300. The arrangement, shape, and size of the recesses 312 across the top surface 306 of the leveling plate 300 allow for engagement (e.g., positioning, nesting, or interlocking) of the leveling plate 300 with another leveling plate or with one or more auxiliary components (e.g., support legs, jacking screws, etc.) extending from a load supported by the leveling plate 300.

The leveling plate 300 further defines four grooves 301 (e.g., release grooves) that are each located along a respective edge of the top surface 306. The grooves 301 help facilitate separation of the leveling plate 300 from another leveling plate or an auxiliary component that may be stuck to the leveling plate 300 after being stacked under pressure for a duration of time. For example, an appropriate tool (e.g., a screw driver, a chisel, or a pry bar) may be inserted into a groove 301 between the top surface 306 of the leveling plate 300 and an adjacent plate that is stacked atop the top leveling plate 300 to separate (e.g., pry apart) the plates.

Referring to FIG. 3B, the leveling plate 300 includes five posts 303 that extend from the bottom surface 308 of the leveling plate 300. The posts 303 are generally circular in cross-sectional shape. The arrangement, size, and shape of the posts 303 allow the posts 303 to engage (e.g., nest with) respective recesses 112, 212, 217 of the rollers 100, 200. Accordingly, the spacing amongst the posts 303 (e.g., as measured from centers of the posts 303) is approximately equal to the spacing amongst respective recesses 112, 212, 217 of the rollers 100, 200. Two posts 303 are positioned along the first side 314 of the leveling plate 300, and two posts 303 are positioned along the second side 316 of the leveling plate 300 opposite the first side 314. One post 303 is located at an approximate center of the bottom surface 308 of the leveling plate 300. Therefore, the configuration of the posts 303 allows the leveling plate 300 and the base 102, 202 of the roller 100, 200 to nest with each other such that the leveling plate 300 and the roller 100, 200 are substantially prevented from moving with respect to each other in two dimensions.

Figure 4:
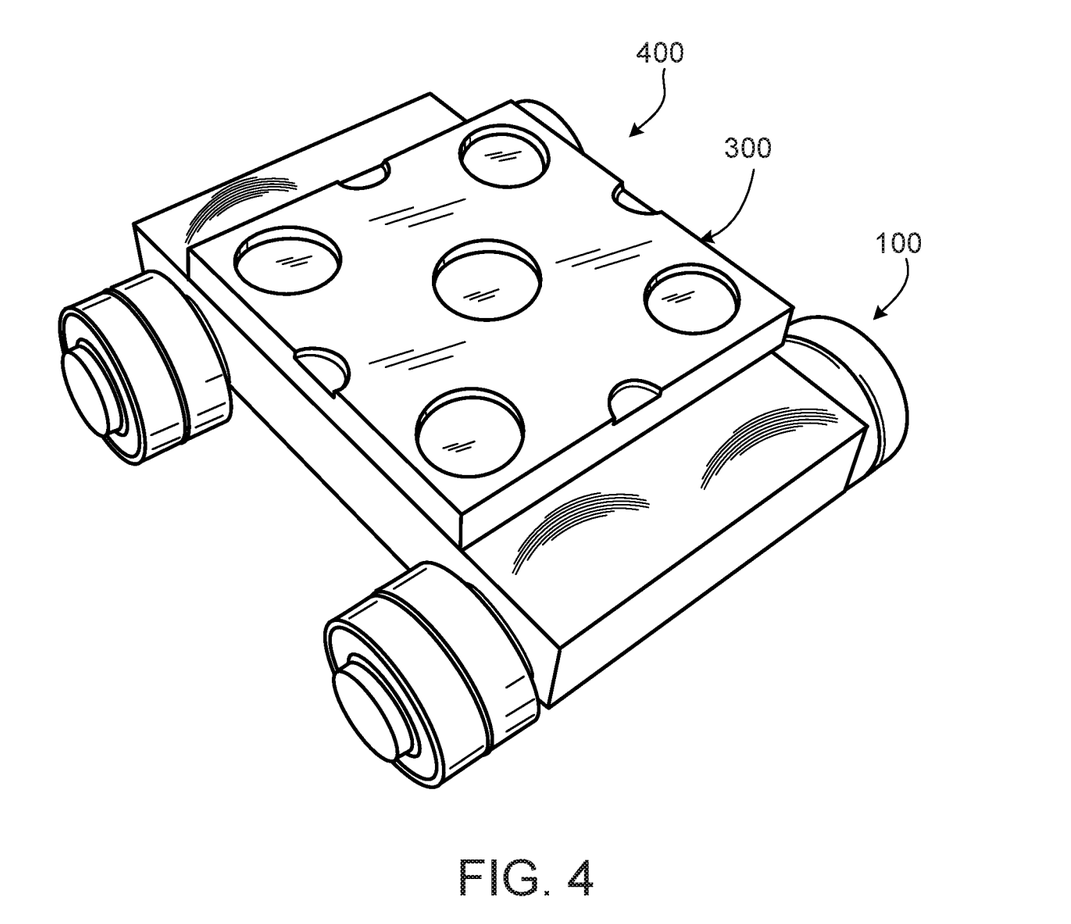
FIG. 4 is a perspective view of a stacked roller including the roller of FIGS. 1A and 1B and the leveling plate of FIGS. 3A and 3B.

FIG. 4 illustrates a stacked roller 400 that includes the roller 100 and one or more of the leveling plates 300 (only one leveling plate 300 shown). A leveling plate 300 is stacked atop the roller 100, such that the posts 303 (shown in FIG. 3B) of the leveling plate 300 engage (e.g., nest with) the respective recesses 112 of the roller 100 (shown in FIG. 1A). In some implementations, the stacked roller 400 may be positioned underneath a load (e.g., a machine, an industrial equipment item, a package, etc.) for leveling and/or transporting the load. In some examples, the stacked roller 400 may be configured to transport loads of up to about 100,000 lb.

Figure 5:
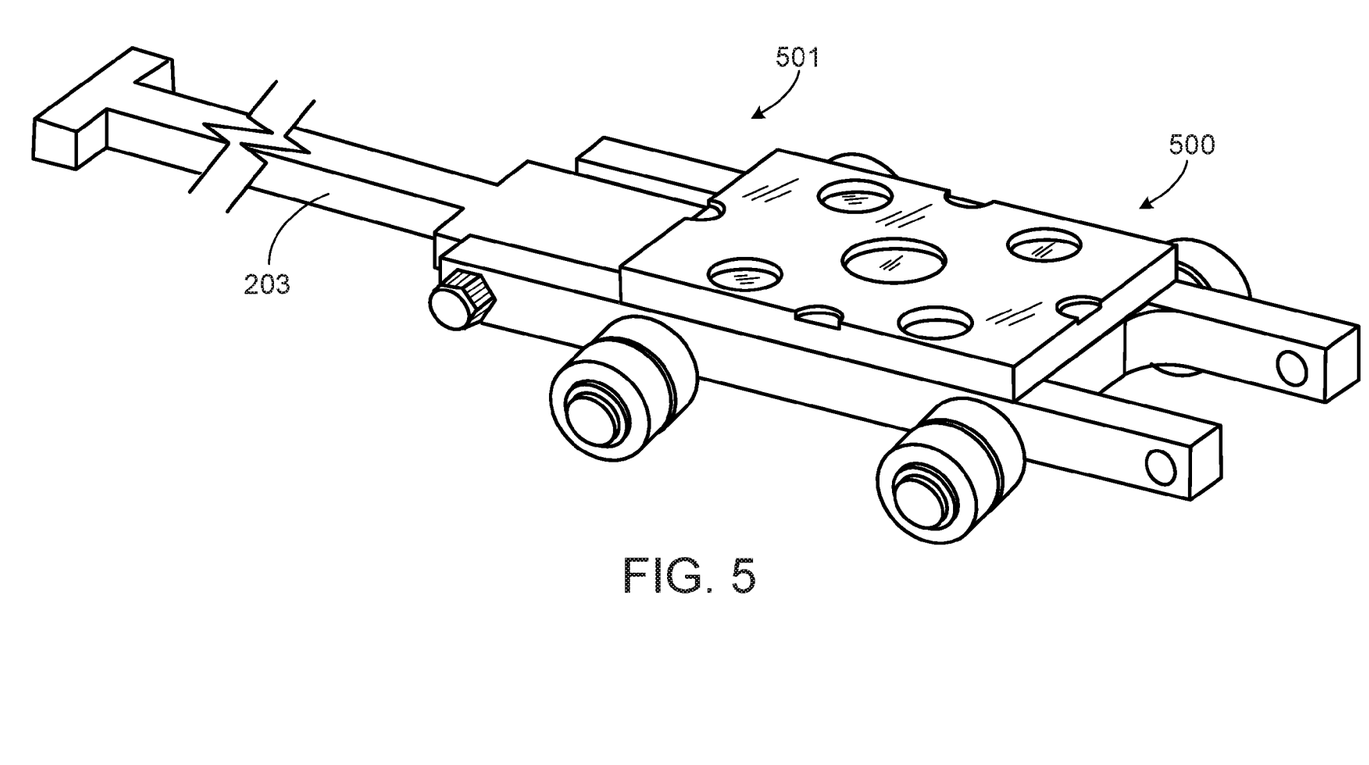
FIG. 5 is a perspective view of a stacked roller assembly including the roller assembly of FIG. 2 and the leveling plate of FIGS. 3A and 3B.

FIG. 5 illustrates a stacked roller assembly 501 that includes a stacked roller 500 and the handle 203, which can be used for steering the stacked roller 500. The stacked roller 500 includes the roller 200 and one or more of the leveling plates 300 (only one leveling plate 300 shown). A leveling plate 300 is stacked atop the roller 200, such that the peripheral posts 303 (shown in FIG. 3B) of the leveling plate 300 engage (e.g., nest with) the respective recesses 212 of the roller 200 (shown in FIG. 1A). The central post 303 (shown in FIG. 3B) of the leveling plate 300 engages the concentric level 221 of the graduated recess 217 (shown in FIG. 2A) of the roller 200. In some implementations, the stacked roller 500 may be positioned underneath a load (e.g., a machine, industrial equipment item, a package, etc.) for leveling and/or transporting the load. In some examples, the stacked roller 500 may be configured to transport loads of up to about 100,000 lb.

Figure 6:
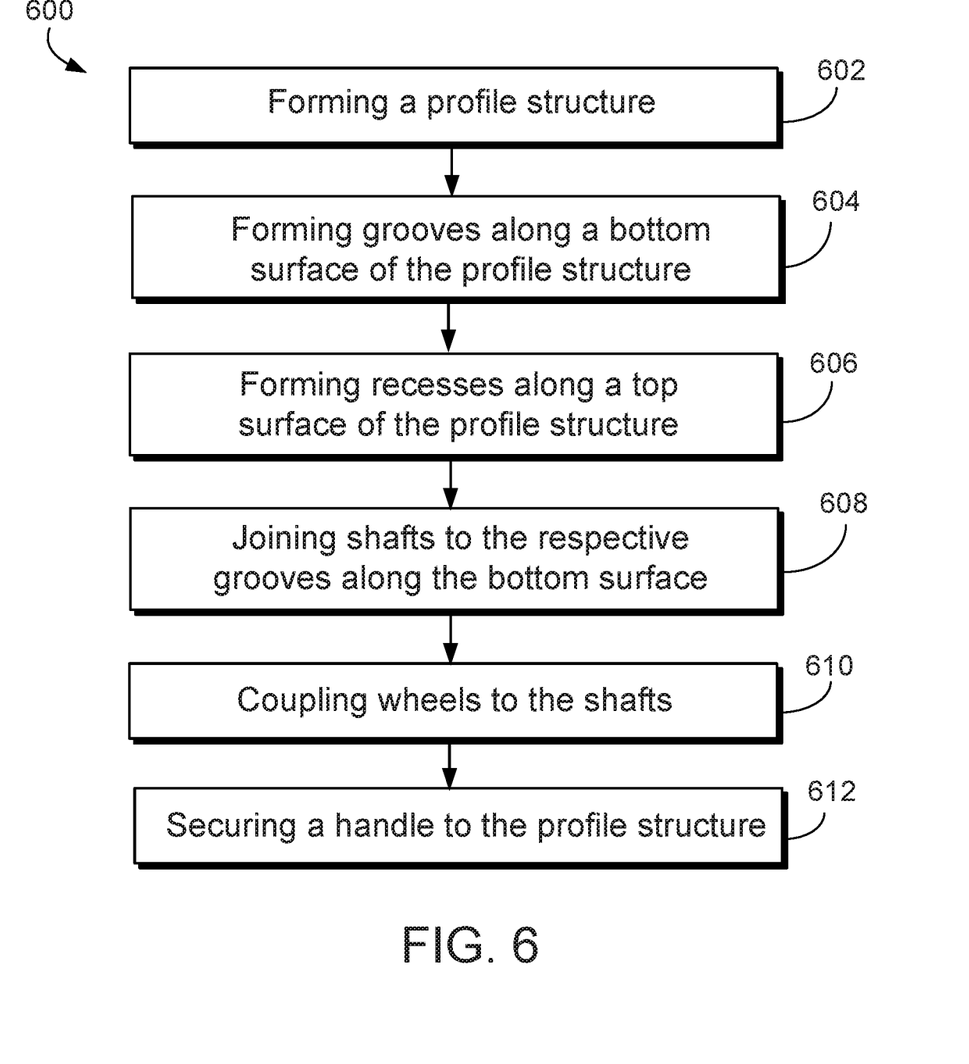
FIG. 6 is a flowchart of an example process for manufacturing the roller assembly of FIG. 2.

FIG. 6 illustrates a flowchart of an example process 600 for manufacturing the roller assembly 201. A profile structure of the base 202 (e.g., a section of material that has the H-shaped cross-section of the base 202) of the roller 200 is formed (e.g., cut) from a plate of material (e.g., steel, aluminum, titanium, or an exotic alloy, such as Inconel or Monel) of rough dimension (602). A texture may be applied to (e.g., etched in or adhered to) the plate of material before the profile of the base 202 is formed, or the texture may be applied to the surface of the base 202 after the base 202 is formed from the plate of material. Material is removed from the bottom surface 208 of the base 202 via a subtraction operation (e.g., milling) to form two elongate grooves along the bottom surface 208 of the base 202 (604). The grooves are oriented parallel to the third and fourth sides 220, 222 of the base 102 and sized and positioned to receive the shafts 118. The recesses 212, 217 are formed along the top surface 206 of the base 202 via a subtraction operation (e.g., milling) (606). In some examples, the recesses 212, 217 may be formed prior to forming the grooves along the bottom surface 208 of the base 202.

The shafts 118 may be formed (e.g., cut to length) from tube stocks of material (e.g., steel, aluminum, titanium, or an exotic alloy, such as Inconel or Monel) and joined (e.g., welded) to the respective grooves along the bottom surface 208 of the base 202 (608). One or more of the retaining clips 124 may be mounted on each end of the shafts 118, adjacent respective first and second sides 214, 216 of the base 202. A lubricant (e.g., synthetic grease) may be applied to the ends of the shafts 118. The wheels 104 may be formed via computer numerical control (CNC) machining or milling and mounted on respective ends of the shafts 118, adjacent the respective retaining clips 124 (610). One or more additional retaining clips 124 may then be mounted adjacent outer sides of each wheel 104 to secure the wheel 104 to the respective end of the shaft 118. The handle 203 may be formed via CNC machining or fabrication and secured to the base 202 of the roller 200 with the bolt 215 (612).

In some implementations, the roller 100 may be manufactured in a manner similar to that of the roller 200, with the exception that the base 102 is formed to have a generally rectangular cross-sectional shape (as opposed to an H-shaped cross-section). Accordingly, the roller 100 as formed may not include projections and openings configured to couple with the handle 203. Furthermore, the roller 100 may include the central recess 112 instead of a graduated central recess.

Figure 7:
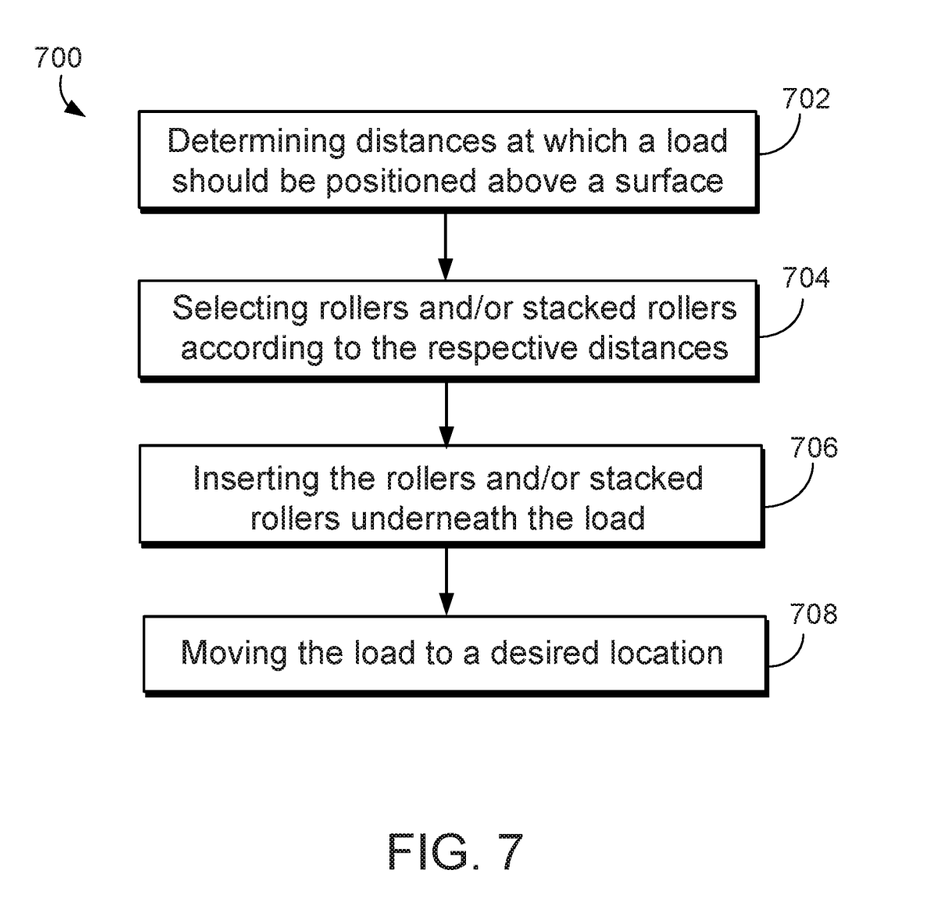
FIG. 7 is a flowchart of an example process for transporting a load using the roller assembly of FIG. 2.

FIG. 7 illustrates a flowchart of an example process 700 for transporting a load (e.g., a machine, an industrial equipment item, a package, etc.) across a support surface (e.g., a manufacturing floor or a ramp) using one or more of the rollers 100, 200 and/or the stacked rollers 400, 500. In some implementations, at least two or more rollers 100, 200 and/or stacked rollers 400, 500 may be used to transport the load. For example, a load may be supported on one side by a roller 100 or a stacked roller 400, while being supported on an opposite side by a roller assembly 201 or a stacked roller assembly 501.

In some examples, the load may include load-bearing supports (e.g., support legs) that extend from a bottom side of the load (e.g., from the bottom side of a machine near respective corners of the machine). The load may be supported on the surface. In some implementations, distances may be determined at which one or more portions of the load should be positioned above the support surface (702), in order to stably, safely, or otherwise adequately transport the load and/or in order to level the load for appropriate operational performance once the load has been moved to a desired location. According to the distances, respective rollers 100, 200 may be selected for placement underneath the load (704), and/or one or more of the leveling plates 300 may be stacked adjacent respective rollers 100, 200 to form the stacked rollers 400, 500 of adjustable height for placement underneath the load. For example, the rollers 100, 200 and/or the stacked rollers 400, 500 may be placed underneath and in direct contact with respective load-bearing supports of the load.

One or more of the rollers 200 or the stacked rollers 500 may be coupled with the handle 203 to allow for positioning of the load (e.g., via pulling or pushing) from one or more sides of the load. In some implementations, the one or more rollers 100, 200 and/or stacked rollers 400, 500 may be positioned underneath the load by lifting the load (e.g., using a pump or another jacking device), placing the roller 100, 200 or stacked roller 400, 500 underneath the load, and then lowering the load onto the roller 100, 200 or stacked roller 400, 500.

The one or more rollers 100, 200 and/or stacked rollers 400, 500 may have individual or combined strengths that are sufficient to support the weight of the load. The one or more rollers 100, 200 and/or stacked rollers 400, 500 are inserted (e.g., one at a time) underneath the respective one or more load-bearing supports of the load, such that the respective regions of the load are lifted above their initial heights (706). In some examples, the one or more rollers 100, 200 and/or stacked rollers 400, 500 may be positioned such that a leveling component (e.g., a jacking screw) of the load engages a recess 112, 212, 217, 312 of the rollers 100, 200 or of the leveling plate 300. In cases where the leveling component directly engages the central recess 217 of the roller 200, the leveling component may bear against either of the concentric levels 219, 221 or the groove 223. In some examples, the recesses 112, 212, 217, 312 provide a self-capturing capability to the rollers 100, 200 and the leveling plate 300, respectively, facilitating positioning (e.g., aligning) of an auxiliary component of the load relative to the rollers 100, 200 and the leveling plate 300. In some examples, the graduated feature of the central recess 217 provides the roller 200 with a self-centering capability, facilitating settling (e.g., gravity-induced settling or settling due to an externally applied force) of an auxiliary component within the level 221 or the groove 223 of the recess 217.

Upon placing the one or more rollers 100, 200 and/or stacked rollers 400, 500 underneath the load, the load is moved (e.g., pushed or pulled) to a desired location (708). In some implementations, the load is moved by applying a force to one or more handles 203 coupled to respective rollers 200 supporting the load. In some implementations, none of the rollers 100, 200 are coupled to a handle 203, and the load may be moved by another moving device (e.g., a block and tackle) that is secured to the load.

While particular embodiments have been described for illustration purposes, other embodiments are within the scope of the following claims. For example, other embodiments may include components or features that have dimensions, sizes, shapes, numbers, positions, and/or arrangements different from those of the particular embodiments described. Additionally, actions recited in certain claims can be performed in an order different from those of particular implementations described and still achieve desirable results. For example, the processes depicted in the accompanying figures do not necessarily require the particular order shown or sequential order to achieve desirable results.

What is claimed is:

1. A method of transporting a load across a support surface, the method comprising:
   inserting at least two roller assemblies underneath the load, the at least two roller assemblies having a strength that is sufficient to support the load, each roller assembly comprising:
   a base structure defining a plurality of recesses that extend inwardly from a top surface of the base structure, the plurality of recesses being configured such that at least one of the plurality of recesses is engageable with an auxiliary component of the load, and the plurality of recesses comprising a central recess positioned at a center of the top surface of the base structure,
   a first wheel disposed along a first side of the base structure, and
   a second wheel disposed along a second side of the base structure, the second side of the base structure being spaced apart from and parallel to the first side of the base structure;
   positioning the auxiliary component of the load within a recess of the plurality of recesses; and
   moving the load across the support surface while the at least two roller assemblies are disposed underneath the load.

2. The method of claim 1, further comprising:
   determining distances at which the load should be positioned above the support surface; and
   selecting the at least two roller assemblies to be inserted underneath the load based on the determined distances.

3. The method of claim 1, further comprising lifting the load from the support surface.

4. The method of claim 1, further comprising adjusting a height of at least one of the two roller assemblies.

5. The method of claim 1, wherein moving the load across the support surface comprises applying a force to a handle coupled to at least one of the two roller assemblies.

6. The method of claim 5, wherein the base structure comprises first and second projections that extend respectively along the first and second sides of the base structure, and wherein the first and second projections of the base structure define an opening sized to receive an end portion of the handle.

7. The method of claim 1, wherein the plurality of recesses are spaced apart from one another, such that two of the plurality of recess are disposed adjacent the first side of the base structure and two of the plurality of recesses are disposed adjacent the second side of the base structure.

8. A method of manufacturing a roller assembly, the method comprising:
   forming a profile;
   forming a plurality of recesses that extend inwardly from a first surface of the profile to form a base structure of the roller assembly, the plurality of recesses being configured such that at least one of the plurality of recesses is engageable with an auxiliary component of a load, and the plurality of recesses comprising a central recess positioned at a center of the first surface of the profile;
   positioning the auxiliary component of the load within a recess of the plurality of recesses;
   coupling a first wheel to the base structure along a first side of the base structure; and
   coupling a second wheel to the base structure along a second side of the base structure, the second side of the base structure being spaced apart from and parallel to the first side of the base structure.

9. The method of claim 1, wherein the auxiliary component comprises a leveling plate configured to level the load on the top surface of the base structure, the leveling plate comprising a leveling plate bottom surface comprising a plurality of posts formed in and extending away from the leveling plate bottom surface, wherein nesting the auxiliary component of the load with the recess of the plurality of recesses comprises positioning at least one of the plurality of posts within the recess.

10. The method of claim 8, further comprising:
texturing a top surface of the base structure by at least one of scoring, knurling or adding a non-skid coating to the top surface of the base structure;
texturing a bottom surface of the base structure by at least one of scoring, knurling or adding the non-skid coating to the bottom surface of the base structure; and
texturing inner surfaces of the plurality of recesses by at least one of scoring, knurling or adding the non-skid coating to the inner surfaces of the plurality of recesses.

* * * * *